(12) United States Patent
Kisen et al.

(10) Patent No.: US 7,510,648 B2
(45) Date of Patent: Mar. 31, 2009

(54) METHOD FOR DESULFURIZATION OF LIQUID HYDROCARBONS AND PROCESS FOR PRODUCTION OF HYDROGEN FOR FUEL CELLS

(75) Inventors: Tadashi Kisen, Chiba (JP); Hiroto Matsumoto, Chiba (JP); Hisashi Katsuno, Chiba (JP); Kazuhito Saito, Tokyo (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 491 days.

(21) Appl. No.: 10/519,681

(22) PCT Filed: Jul. 22, 2003

(86) PCT No.: PCT/JP03/09247

§ 371 (c)(1),
(2), (4) Date: Jan. 7, 2005

(87) PCT Pub. No.: WO2004/009735

PCT Pub. Date: Jan. 29, 2004

(65) Prior Publication Data

US 2006/0131215 A1     Jun. 22, 2006

(30) Foreign Application Priority Data

Jul. 22, 2002  (JP) .......................... 2002-212384

(51) Int. Cl.
C10G 29/00 (2006.01)
C10G 29/04 (2006.01)
C01B 3/24 (2006.01)
C01B 3/26 (2006.01)

(52) U.S. Cl. ............ 208/208 R; 208/213; 208/216 R; 208/217; 208/243; 208/244; 423/650; 423/651; 423/652; 423/653; 423/654

(58) Field of Classification Search ............... 423/653, 423/654, 650, 651, 652; 208/208 R, 213, 208/216 R, 217, 243, 244
See application file for complete search history.

(56) References Cited

U.S. PATENT DOCUMENTS

| | | | | |
|---|---|---|---|---|
| 5,026,536 A | * | 6/1991 | Shioiri et al. | 423/652 |
| 5,124,140 A | * | 6/1992 | Okada et al. | 423/650 |
| 5,130,114 A | * | 7/1992 | Igarashi | 423/652 |
| 5,130,115 A | * | 7/1992 | Fujisou et al. | 423/652 |

FOREIGN PATENT DOCUMENTS

| | | |
|---|---|---|
| JP | 2001-279274 | 10/2001 |
| JP | 2001-342466 | 12/2001 |
| WO | 01/15804 | 3/2001 |
| WO | 01/44407 | 6/2001 |

\* cited by examiner

*Primary Examiner*—Wayne Langel
(74) *Attorney, Agent, or Firm*—Oblon, Spivak, McClelland, Maier & Neustadt, P.C.

(57) ABSTRACT

The invention provides an optimum method for utilizing a desulfurizing agent for liquid hydrocarbons which can efficiently remove sulfur content from kerosene without performing addition of hydrogen to a low sulfur concentration and which has a prolonged lifetime.

The invention provides a desulfurization method which includes removing sulfur content from kerosene by use of a metallic desulfurizing agent without performing addition of hydrogen, characterized in that the method employs desulfurization conditions satisfying the following formula (1):

$$1.06 \times P_{ope}^{0.44} < T_{ope}/T_{50} < 1.78 \times P_{ope}^{0.22} \qquad (1)$$

(wherein $T_{ope}$ is operation temperature (° C.); $P_{ope}$ is operation pressure (MPa); and $T_{50}$ is a temperature per 50 percent recovered as determined by "test method for distillation at atmospheric pressure" stipulated in JIS K2254 "Petroleum products—Determination of distillation characteristics as revised in 1998").

5 Claims, No Drawings

METHOD FOR DESULFURIZATION OF LIQUID HYDROCARBONS AND PROCESS FOR PRODUCTION OF HYDROGEN FOR FUEL CELLS

CROSS REFERENCES TO RELATED APPLICATIONS

This application is a national stage application of International Patent Application No. PCT/JP2003/009247, filed on Jul. 22, 2003, and claims priority to Japanese Patent Application No. 2002-212384, filed on Jul. 22, 2002, both of which are incorporated herein by reference in their entireties.

TECHNICAL FIELD

The present invention relates to a method for effectively removing sulfur and sulfur-containing compounds (hereinafter collectively referred to as sulfur content) from in a liquid hydrocarbon by use of a metallic desulfurizing agent to a low concentration, and to a method for producing hydrogen for use in fuel cells.

BACKGROUND ART

In recent years, new energy-production techniques have attracted attention, from the standpoint of environmental issues, and among these techniques a fuel cell has attracted particular interest. The fuel cell converts chemical energy to electric energy through electrochemical reaction of hydrogen and oxygen, attaining high energy utilization efficiency. Therefore, extensive studies have been carried out on realization of fuel cells for civil use, industrial use, automobile use, etc.

Fuel cells are categorized in accordance with the type of employed electrolyte, and, among others, a phosphate type, a fused carbonate salt type, a solid oxide type, and a solid polymer type have been known. With regard to hydrogen sources, studies have been conducted on methanol; liquefied natural gas predominantly containing methane; city gas predominantly containing natural gas; a synthetic liquid fuel produced from natural gas serving as a feedstock; and petroleum-derived hydrocarbons such as petroleum-derived LPG, naphtha, and kerosene.

Upon use (e.g., civil use or automobile use) of fuel cells, the aforementioned petroleum-derived hydrocarbons, inter alia, kerosene, gas oil, and gasoline, are advantageously employed as hydrogen sources, since the hydrocarbons are in the form of liquid at ambient temperature and pressure, are easy to store and handle, and supply systems (e.g., gasoline stations and service stations) are well-furnished.

When hydrogen is produced from the petroleum-derived hydrocarbons, the hydrocarbons are generally autothermal-reformed, steam-reformed, or partial-oxidation-reformed, in the presence of a reforming catalyst. During such reforming processes, the aforementioned reforming catalyst is poisoned by sulfur content in the hydrocarbons. Thus, a key issue from the viewpoint of service life of the catalyst is that the hydrocarbons have been desulfurized to a low sulfur concentration.

When a commercial kerosene product is reformed so as to produce hydrogen for use in fuel cells, the sulfur content in the kerosene must be reduced to 0.2 mass ppm or lower, preferably 0.1 mass ppm or lower, over a long period of time, in order to prevent poisoning of the reforming catalyst by kerosene.

Among industrial methods for producing desulfurized kerosene, hydrodesulfurization is generally employed. In one embodiment of the method, hydrodesulfurization is performed by use of a hydrodesulfurization catalyst such as Co—Mo/alumina or Ni—Mo/alumina, and an $H_2S$-adsorbent such as ZnO and at normal pressure to 5 MPa and 200 to 400° C. However, the method has drawbacks. Specifically, hydrogen must be recycled, thereby requiring a complicated facility for producing a fuel oil for use in fuel cells. In addition, the consumption of utilities increases. In a small-sized fuel cell system, employment of hydrodesulfurization for producing a fuel oil for use in the fuel cell renders the system very complicated. Therefore, a desulfurization system that does not require addition of hydrogen has been demanded.

Meanwhile, nickel-based or nickel-copper-based adsorbents (desulfurizing agents) are known to be desulfurizing agents which allow removal of sulfur content from a petroleum-derived hydrocarbon through adsorption under mild conditions without performing hydro-refining so as to lower the sulfur concentration to 0.2 mass ppm or lower (Japanese Patent Publication (kokoku) Nos. 6-65602, 7-115842, and 7-115843; Japanese Patent Application Laid-Open (kokai) Nos. 1-188405, 2-275701, 2-204301, 5-70780, 6-80972, 6-91173, and 6-228570 (nickel-based adsorbents); and Japanese Patent Application Laid-Open (kokai) No. 6-315628 (nickel-copper-based adsorbent)).

There have been proposed a variety of desulfurization conditions under which kerosene is desulfurized by use of the aforementioned nickel-based or nickel-copper-based desulfurizing agents. However, although the quality of kerosene serving as a feedstock varies depending on the production method, the relationship between the quality of kerosene serving as a feedstock and optimum desulfurization conditions has not yet been elucidated. Thus, the maximum performance of these desulfurizing agents has not yet been attained. In addition, detailed desulfurization conditions are not disclosed for the case where a gasoline fraction or a gas oil fraction is employed as a feedstock.

Among others, the aforementioned Japanese Patent Publication (kokoku) Nos. 6-65602 and 7-115842 disclose methods for desulfurizing kerosene employing a nickel-based desulfurizing agent without performing addition of hydrogen, and also disclose desulfurization reaction conditions. However, these documents never disclose in detail optimum desulfurization conditions that are determined as appropriate from the quality of kerosene.

The aforementioned Japanese Patent Application Laid-Open (kokai) No. 1-188405 also discloses a method for desulfurizing kerosene employing a nickel-based desulfurizing agent without performing-addition of hydrogen, as well as desulfurization reaction conditions. However, the reaction conditions disclosed therein are obtained by simply widening the range of the reaction conditions disclosed in the aforementioned Japanese Patent Publication (kokoku) No. 6-65602. Thus, similar to the above cases, the document never discloses in detail optimum desulfurization conditions that are determined as appropriate from the quality of kerosene.

The feedstock kerosene employed in the Examples of Japanese Patent Publication (kokoku) No. 6-65602 and that employed in the Examples of Japanese Patent Application Laid-Open (kokai) No. 1-188405 are almost identical in terms of quality, but differ in terms of optimum temperature range for desulfurization. This contradiction is considered to be attributable to the failure to elucidate the relationship between the quality of kerosene and optimum desulfurization conditions.

The aforementioned Japanese Patent Publication (kokoku) No. 7-115843 also discloses a method for desulfurizing kerosene employing a nickel-based desulfurizing agent without performing addition of hydrogen, as well as optimum ranges of desulfurization conditions. However, the patent publication includes the ranges of conditions disclosed in Japanese Patent Publication (kokoku) Nos. 6-65602 and 7-115842 and Japanese Patent Application Laid-Open (kokai) No. 1-188405, and includes no new information. Furthermore, the patent publication never discloses the relationship between the quality of kerosene and optimum desulfurization conditions.

In addition to the aforementioned patent publications, Japanese Patent Application Laid-Open (kokai) Nos. 2001-342466, 2001-342465, 2001-279274, 2001-279281, 2001-279260, 2001-279259, 2001-279257, 2001-279255, 2001-278602, 2001-276605, and 2001-252556, which were already filed by the present applicant, disclose desulfurization methods employing a nickel-based desulfurizing agent without performing addition of hydrogen, as well as desulfurization reaction conditions. However, no relationship between the quality of kerosene and optimum desulfurization conditions suited for the quality has been elucidated.

DISCLOSURE OF THE INVENTION

In view of the foregoing, an object of the present invention is to provide an optimum method for utilizing a desulfurizing agent for liquid hydrocarbons such as kerosene, which method can efficiently remove sulfur content from a liquid hydrocarbon oil such as kerosene to a low sulfur concentration, preferably without performing addition of hydrogen, and which has a prolonged lifetime.

The present inventors have carried out extensive studies on the relationship between the quality of liquid hydrocarbon oil such as kerosene and desulfurization performance, and have found that there exists a specific relationship between distillation characteristics of a liquid hydrocarbon and optimum desulfurization conditions for hydrocarbon. The present invention has been accomplished on the basis of this finding.

Accordingly, the present invention provides the following.

1. A desulfurization method comprising removing sulfur content from liquid hydrocarbon by use of a metallic desulfurizing agent, characterized in that the method employs desulfurization conditions satisfying the following formula (1):

$$1.06 \times P_{ope}^{0.44} < T_{ope}/T_{50} < 1.78 \times P_{ope}^{0.22} \quad (1)$$

(wherein $T_{ope}$ represents operation temperature (°C.); $P_{ope}$ represents operation pressure (MPa); and $T_{50}$ represents a temperature per 50 percent recovered as determined by "test method for distillation at atmospheric pressure" stipulated in JIS K2254 "Petroleum products—Determination of distillation characteristics") as revised in 1998.

2. The desulfurization method as described in the item 1 above, wherein the desulfurization conditions satisfy the following formula (2):

$$1.19 \times P_{ope}^{0.35} < T_{ope}/T_{50} < 1.68 \times P_{ope}^{0.24} \quad (2)$$

(wherein $T_{ope}$, $P_{ope}$, and $T_{50}$ are the same as defined in the item 1 above).

3. The desulfurization method as described in the item 1 or 2 above, wherein the method employs no hydrogen addition.

4. The desulfurization method as described in any one of the items 1 to 3 above, wherein the metallic desulfurizing agent comprises a porous inorganic oxide and a metallic element including at least nickel (Ni) supported thereon.

5. The desulfurization method as described in the item 4 above, wherein the metallic desulfurizing agent is a nickel-copper-based desulfurizing agent.

6. The desulfurization method as described in any one of the items 1 to 5 above, wherein the liquid hydrocarbon is one species selected from the group consisting of a gasoline fraction, a kerosene fraction, and a gas oil fraction.

7. A method for producing hydrogen for use in a fuel cell, characterized in that the method comprises reforming a liquid hydrocarbon which has been desulfurized through a desulfurization method as recited in any one of the items 1 to 6 above.

8. The method for producing hydrogen for use in a fuel cell as described in the item 7 above, wherein the reforming is partial-oxidation reforming, autothermal reforming, or steam reforming.

9. The method for producing hydrogen for use in a fuel cell as described in the item 8 above, wherein partial-oxidation reforming, autothermal reforming, or steam reforming is performed in the presence of a reforming catalyst containing ruthenium or nickel.

10. The method for producing hydrogen for use in a fuel cell as described in the item 9 above, wherein the reforming catalyst contains manganese oxide, cerium oxide, or zirconium oxide.

BEST MODE FOR CARRYING OUT THE INVENTION

The present invention will next be described in detail.

The desulfurization method according to the present invention comprising removing sulfur content from liquid hydrocarbon by use of a metallic desulfurizing agent without performing addition of hydrogen, characterized in that the method employs desulfurization conditions satisfying the following formula (1):

$$1.06 \times P_{ope}^{0.44} < T_{ope}/T_{50} < 1.78 \times P^{0.22} \quad (1)$$

(wherein $T_{ope}$ represents operation temperature (°C.); $P_{ope}$ represents operation pressure (MPa); and $T_{50}$ represents a temperature per 50 percent recovered as determined by "test method for distillation at atmospheric pressure" stipulated in JIS K2254 "Petroleum Products—-Determination of distillation characteristics") as revised in 1998.

No particular limitation is imposed on the metallic desulfurizing agent employed in the desulfurization method of the present invention. However, a (metallic element including at least nickel)-on-carrier type catalyst is preferred. A metallic element other than nickel may be co-presence in a small amount with nickel at need. Examples of the metallic element include copper, cobalt, iron, manganese, and chromium. As the metallic desulfurizing agent, a nickel-copper-based desulfurizing agent is particularly preferred.

The metallic desulfurizing agent containing at least nickel preferably has a supported nickel content (as reduced to metallic nickel) of 30% by mass or more based on the total amount of the desulfurizing agent. When the amount of metallic nickel supported is 30% by mass or more, desulfurization performance can be fully attained. In contrast, when the amount of supported nickel is excessively large, the relative amount of the carrier decreases, thereby causing decrease in mechanical strength and desulfurization performance of the desulfurizing agent. In consideration of desulfurization performance, mechanical strength, etc., the amount of supported metallic nickel preferably falls within a range of 50 to 80% by mass.

Among carriers, a porous carrier is preferred, with a porous inorganic oxide being particularly preferred. Examples of the porous inorganic oxide include silica, alumina, silica-alumina, titania, zirconia, magnesia, zinc oxide, terra alba, clay, and diatomaceous earth. These oxides may be used singly or in combination of two or more species. Of these, silica-alumina is particularly preferred.

No particular limitation is imposed on the method for supporting the metal on the carrier, and any conventionally known methods such as impregnation, co-precipitation, and kneading may be employed.

One of the preferred desulfurizing agents is a nickel supported on alumina-silica carrier. The agent may be produced through, for example, the following co-precipitation method.

In the co-precipitation method, an acidic aqueous solution or an acidic aqueous dispersion containing a nickel source and an aluminum source and a basic aqueous solution containing a silicon source and an inorganic base are prepared in advance. Examples of the nickel source employed in the acidic aqueous solution or the acidic aqueous dispersion include nickel chloride, nickel nitrate, nickel sulfate, and hydrates thereof. Examples of the aluminum source include aluminum nitrate; alumina hydrates such as pseudo-boehmite, boehmite alumina, bayerite, and gibbsite; and γ-alumina.

No particular limitation is imposed on the silicon source employed in the basic aqueous solution, so long as the silicon source is soluble in an alkaline aqueous solution and forms silica through calcination. Examples include orthosilicic acid, metasilicic acid, sodium salts thereof, potassium salts thereof, and water glass. Examples of the inorganic base include alkali metal carbonates and alkali metal hydroxides.

Subsequently, the thus-prepared acidic aqueous solution or acidic aqueous dispersion and the basic aqueous solution are individually heated to about 50 to 90° C., and two aqueous solutions are combined. The mixture is further maintained at about 50 to 90° C., thereby completing reaction.

After completion of reaction, the formed solid is washed thoroughly, followed by removing the washed solid from the liquid. Alternatively, the formed solid is removed from the liquid, followed by thorough washing. The thus-treated solid is dried at about 80 to 150° C. through a conventionally known method. The dried product is calcined preferably at 200 to 400° C., thereby yielding a desulfuring agent which nickel is supported on silica-alumina carrier.

Desulfurization conditions for liquid hydrocarbon by use of the above-prepared metallic desulfurizing agent will next be described.

The present inventors have found that desulfurization conditions for liquid hydrocarbon (operation pressure and operation temperature) must fall within a certain range that is determined as appropriate from distillation characteristics of the liquid hydrocarbon employed. That is, sulfur content of liquid hydrocarbon can be sufficiently removed, and desulfurization performance of the metallic desulfurizing agent can be maintained for a long period of time, when operation pressure (Pope) and operation temperature ($T_{ope}$) satisfy the following formula (1):

$$1.06 \times P_{ope}^{0.44} < T_{ope}/T_{50} < 1.78 \times P_{ope}^{0.22} \quad (1).$$

More preferably, operation pressure ($P_{ope}$) and operation temperature ($T_{ope}$) satisfy the following formula (2):

$$1.19 \times P_{ope}^{0.35} < T_{ope}/T_{50} < 1.68 \times P_{ope}^{0.24} \quad (2).$$

In the above formulae, $T_{ope}$ represents operation temperature (° C.); $P_{ope}$ represents operation pressure (MPa); and $T_{50}$ represents a temperature per 50 percent recovered as determined by "test method for distillation at atmospheric pressure" stipulated in JIS K2254 "Petroleum products—Determination of distillation characteristics" as revised in 1998.

When the unit of operation pressure is changed from MPa to kg/cm² A, the aforementioned formulae (1) and (2) are reduced to the following formulae (1') and (2'):

$$0.38 \times P_{ope}^{0.44} < T_{ope}/T_{50} < 1.07 \times P_{ope}^{0.22} \quad (1') \text{and}$$

$$0.53 \times P_{ope}^{0.35} < T_{ope}/T_{50} < 0.96 \times P_{ope}^{0.24} \quad (2').$$

$T_{50}$ is one of the parameters showing the distillation characteristics of liquid hydrocarbon employed. When desulfurization conditions are determined on the basis of $T_{50}$ and any of the aforementioned formulae, the determined desulfurization conditions are most suitable for distillation characteristics of the liquid hydrocarbon.

When $T_{ope}/T_{50}$ is lower than the lower limit ($1.06 \times P_{ope}^{0.44}$ in formula (1)), rate of desulfurization reaction decreases, resulting in deterioration of desulfurization performance, whereas when $T_{ope}/T_{50}$ exceeds the upper limit ($1.78 \times P_{ope}^{0.22}$ in formula (1)), the amount of coke precursor or coke increases, and the desulfurization performance of the metallic desulfurizing agent cannot be maintained for a long period of time.

Next, the procedure of desulfurizing liquid hydrocarbon by use of a metallic desulfurizing agent will be described.

Firstly, a desulfurizing agent is charged into a desulfurization apparatus. The desulfurizing agent contained in the desulfurization apparatus is subjected to reduction treatment at about 150 to 400° C. under hydrogen fed to the apparatus. Alternatively, the desulfurizing agent which has been stabilized in advance through reduction in a separate reduction apparatus may also be employed. In the latter case, reduction of the desulfurizing agent in the desulfurization apparatus is performed at about 150 to 300° C. After stopping of feeding hydrogen to the desulfurization apparatus, liquid hydrocarbon such as kerosene is caused to flow upward or downward in the desulfurization apparatus. In this case, the liquid hydrocarbon such as kerosene is preferably caused to flow at a liquid hourly space velocity (LHSV) of, for example, 0.1 to 2 hr⁻¹. An operation pressure and an operation temperature satisfying the aforementioned formula (1), preferably the formula (2), are employed.

The desulfurized liquid hydrocarbon (e.g., kerosene) which has been produced through the desulfurization method of the present invention has a sulfur concentration of 0.2 mass ppm or less, preferably 0.1 mass ppm or less, more preferably 0.05 mass ppm or less. Therefore, the desulfurized liquid hydrocarbon is remarkably preferred to serve as a fuel oil for producing hydrogen for use in a fuel cell. In the desulfurization method of the present invention, hydrogen may or may not be added to liquid hydrocarbon such as kerosene. However, an approach not including addition of hydrogen is preferably employed, since the approach does not require a complex system and is suitable for producing a fuel oil for use in a small-scale fuel cell.

Next, the method of the present invention for producing hydrogen for use in a fuel cell (hereinafter referred to as production method of the present invention) will be described.

The method of the present invention for producing hydrogen for use in a fuel cell is characterized by comprising reforming the liquid hydrocarbon such as kerosene which has been desulfurized through the aforementioned desulfurization method of the present invention.

In the production method of the present invention, the liquid hydrocarbon such as kerosene which has been desulfurized through the aforementioned desulfurization method of the present invention is reformed by bringing the hydrocarbon to be in contact with a partial-oxidation reforming catalyst, an autothermal reforming catalyst, or a steam reforming catalyst (hereinafter may be collectively referred to simply as reforming catalyst), thereby producing hydrogen for use in a fuel cell.

No particular limitation is imposed on the reforming catalyst employed in the production method of the present invention, and any catalyst conventionally known as a hydrocarbon reforming catalyst may be appropriately selected and employed. Examples of such a reforming catalyst include nickel, zirconium, and a noble metal such as ruthenium, rhodium, or platinum, which are supported on an appropriate carrier. The aforementioned metals to be supported may be used singly or in combination of two or more species. Among these catalysts, a nickel supported catalyst (hereinafter referred to as nickel-based catalyst) and a ruthenium supported catalyst (hereinafter referred to as ruthenium-based catalyst) are preferred. These two types exhibit remarkable prevention effect on deposition of carbon during partial-oxidation reforming, autothermal reforming, or steam reforming.

The carrier for the aforementioned reforming catalysts preferably includes manganese oxide, cerium oxide, zirconia, etc.

In the case of a nickel-based catalyst, the amount of nickel supported on the carrier is preferably 3 to 60% by mass based on the mass of the carrier. When the amount is less than 3% by mass, activity of a partial-oxidation reforming catalyst, an autothermal reforming catalyst, or a steam reforming catalyst may fail to be attained sufficiently, whereas when the amount is in excess of 60% by mass, the effect of enhancement in catalytic activity commensurate with the amount is not clear, which may be disadvantageous in terms of economy. Therefore, the amount of nickel supported on the carrier is preferably 5 to 50% by mass, particularly preferably 10 to 30% by mass, from the viewpoint of catalytic activity and cost.

In the case of a ruthenium-based catalyst, the amount of ruthenium supported on the carrier is preferably 0.05 to 20% by mass based on the mass of the carrier. When the amount is less than 0.05% by mass, activity of a partial-oxidation reforming catalyst, an autothermal reforming catalyst, or a steam reforming catalyst may fail to be attained sufficiently, whereas when the amount is in excess of 20% by mass, the effect of enhancement in catalytic activity commensurate with the amount is not clear, which may be disadvantageous in terms of economy. Therefore, the amount of ruthenium supported on the carrier is preferably 0.05 to 15% by mass, particularly preferably 0.1 to 2% by mass, from the viewpoint of catalytic activity and cost.

The reaction conditions typically employed in partial-oxidation reforming are as follows: pressure of ambient pressure to 5 MPa·G, temperature of 400 to 1,100° C., oxygen ($O_2$)/carbon (C) mole ratio of 0.2 to 0.8, and liquid hourly space velocity (LHSV) of 0.1 to 100 $hr^{-1}$.

The reaction conditions typically employed in autothermal reforming are as follows: pressure of ambient pressure to 5 MPa·G, temperature of 400 to 1,100° C., steam/carbon (C) mole ratio of 0.1 to 10, oxygen ($O_2$)/carbon (C) mole ratio of 0.1 to 1, liquid hourly space velocity (LHSV) of 0.1 to 2 $hr^{-1}$, and gas hourly space velocity (GHSV) of 1,000 to 100,000 $hr^{-1}$.

The reaction conditions employed in steam reforming are as follows: steam/carbon (C) mole ratio (i.e., a ratio of steam to carbon originating from fuel oil) of generally 1.5 to 10, preferably 1.5 to 5, more preferably 2 to 4. When the steam/carbon mole ratio is less than 1.5, the amount of formed hydrogen may decrease, whereas when the mole ratio is in excess of 10, an excessive amount of steam is required, resulting in heat loss, and, in some cases, hydrogen production efficiency may decrease, which are nor preferred.

Preferably, steam reforming is performed at an inlet temperature of a steam reforming catalyst layer of 630° C. or lower, more preferably 600° C. or lower. When the inlet temperature is higher than 630° C., thermal decomposition of fuel oil is promoted, and the thus-generated radicals mediate deposition of carbon on the catalyst or on the wall of a reactor tube, thereby causing difficulty in operation in some cases. No particular limitation is imposed on the outlet temperature of a catalyst layer, but the outlet temperature preferably falls within a range of 650 to 800° C. When the outlet temperature is lower than 650° C., the amount of formed hydrogen may be insufficient, whereas when the temperature is higher than 800° C., the reactor must be made of heat-resistant material, which is not preferred from economical viewpoint.

The reaction pressure is generally ambient pressure to 3 MPa·G, preferably ambient pressure to 1 MPa·G. The LHSV is generally 0.1 to 100 $hr^{-1}$, preferably 0.2 to 50 $hr^{-1}$.

In the production method of the present invention, CO which is by-produced during the aforementioned partial-oxidation reforming, autothermal reforming, or steam reforming adversely affects formation of hydrogen. Therefore, the produced CO is preferably removed by converting to $CO_2$ through reaction.

As described hereinabove, according to the production method of the present invention, hydrogen for use in a fuel cell can be produced at high efficiency, whereby the service life of a reforming catalyst can be prolonged through prevention of poisoning of the catalyst by sulfur content of liquid hydrocarbon oil.

EXAMPLES

The present invention will next be described in more detail by way of examples, which should not be construed as limiting the invention thereto.

<Production of Desulfurizing Agent>

Nickel sulfate hexahydrate (special grade, Wako Pure Chemical Industries, Ltd.) (730.2 g) and copper sulfate pentahydrate (special grade, Wako Pure Chemical Industries, Ltd.) (151.3 g) were dissolved in ion-exchange water (8 L) heated at 80° C. To the solution, pseudo-boehmite (C-AP, $Al_2O_3$ content: 67% by mass, product of Catalysts and Chemicals Industries Co., Ltd.) (16.0 g) was added. To the mixture, iN sulfuric acid (300 mL) was added so as to adjust pH to 2, thereby producing a liquid preparation A. Sodium carbonate (600.0 g) was dissolved in separately provided ion-exchange water heated at 80° C., and water glass (J-1, Si concentration of 29% by mass, product of Nippon Chemical Industrial Co., Ltd.) (180.2 g) was added to the solution, thereby producing a liquid preparation B. While the liquid temperatures were maintained at 80° C., the liquid preparations A and B were instantaneously mixed with each other. The mixture was stirred for one hour. Subsequently, the precipitated cake was washed with ion-exchange water (60 L) by use of a filter, and the product was dried at 120° C. for 12 hours by use of a blower-type drier, followed by calcination at 350° C. for three hours. Thereafter, the thus-formed desulfurizing agent was molded to form pellets. The pellets were pulverized again, thereby yielding a nickel-copper-based desulfurizing agent (desulfurizing agent) having a mean particle size of 0.8 mm.

<Performance Evaluation of Desulfurizing Agent>

The above-produced desulfurizing agent (23 mL) was charged into a SUS reactor tube (inner diameter: 17 mm). Under ambient pressure and hydrogen flow, the temperature of the reactor tube was elevated to 120° C., maintained at 120° C. for 30 minutes, gradually elevated to 350° C., and maintained at 350° C. for 20 hours, to thereby activate the desulfurizing agent. Subsequently, the temperature of the reactor tube was lowered to 140° C. and maintained at 140° C.

Each of the liquid hydrocarbon samples having distillation characteristics or other properties listed in Table 1 was fed to the reactor tube at a liquid hourly space velocity (LHVS) of 3 hr$^{-1}$, and the pressure was controlled to a level shown in Table 2 below by means of a pressure-controlling valve provided at an outlet of the reactor. Desulfurization was performed at a temperature shown in Table 2. The results are shown in Table 2.

The distillation characteristics of liquid hydrocarbons shown in Table 1 were determined by "test method for distillation at atmospheric pressure" stipulated in JIS K2254 "Petroleum products—Determination of distillation characteristics" as revised in 1998.

TABLE 1

Distillation characteristics and other characteristics of kerosene

| Percent recovered (vol. %) | Temperature per percent recovered | | | | |
|---|---|---|---|---|---|
| | Kerosene A | Kerosene B | Kerosene C | Gas oil A | Gasoline A |
| 0 | 150.0 | 152.0 | 152.5 | 148.0 | 31.0 |
| 5 | 162.5 | 166.0 | 171.0 | 161.0 | 40.0 |
| 10 | 164.0 | 167.0 | 176.0 | 170.0 | 44.5 |
| 20 | 170.0 | 175.5 | 185.5 | 182.0 | 55.0 |
| 30 | 176.0 | 184.0 | 193.5 | 196.0 | 64.0 |
| 40 | 183.0 | 193.5 | 200.5 | 213.0 | 77.0 |
| ($T_{50}$) 50 | 191.5 | 203.5 | 208.5 | 231.0 | 95.0 |
| 60 | 201.0 | 214.0 | 216.0 | 252.0 | 109.0 |
| 70 | 211.5 | 224.0 | 224.0 | 271.0 | 123.0 |
| 80 | 221.5 | 237.5 | 235.0 | 293.0 | 133.0 |
| 90 | 236.5 | 254.0 | 249.0 | 322.0 | 142.0 |
| 95 | 247.0 | 265.5 | 258.5 | — | 153.0 |

TABLE 1-continued

Distillation characteristics and other characteristics of kerosene

| Percent recovered (vol. %) | Temperature per percent recovered | | | | |
|---|---|---|---|---|---|
| | Kerosene A | Kerosene B | Kerosene C | Gas oil A | Gasoline A |
| 97 | 254.0 | 271.0 | 264.0 | — | — |
| 100 | 259.5 | 274.5 | 267.0 | 352.0 | 172.0 |
| Total percent recovered (vol. %) | 98.5 | 98.5 | 99.0 | 99.0 | 99.5 |
| Residual oil (vol. %) | 1.5 | 1.5 | 1.0 | 1.0 | 1.0 |
| Distillation loss (vol. %) | 0.0 | 0.0 | 0.0 | 0.0 | 0.5 |
| Density (g/cc) @ 15° C. | 0.7893 | 0.7968 | 0.7971 | 0.8082 | 0.7500 |
| Sulfur concentration (mass ppm) | 31 | 64 | 48 | 11 | 6 |

In Table 2, the "0.2 ppm breakthrough life (liquid hydrocarbon/desulfurizing agent)" is an index for performance of the desulfurizing agent and is defined as the volume of treated liquid hydrocarbon (cc) per unit volume (cc) of desulfurizing agent as measured from the start of desulfurization until the sulfur concentration of desulfurized liquid hydrocarbon such as kerosene exceeds 0.2 mass ppm.

In Table 2, "formula (1)" and "formula (2)" represent the aforementioned expressions provided for determining desulfurization conditions as appropriate from distillation characteristics of employed kerosene samples.

TABLE 2

Desulfurization test results of liquid hydrocarbon samples

| | Liquid hydrocarbon | Operation pressure [MPa]*$^1$ (kg/cm$^2$A) | Operation temp. (° C.) | $T_{ope}/T_{50}$ | Formula (1) | | Formula (2) | | 0.2 ppm Breakthrough life (liquid hydrocarbon/ desulfurizing agent) |
|---|---|---|---|---|---|---|---|---|---|
| | | | | | $1.06 \times P_{ope}^{0.44}$ | $1.78 \times P_{ope}^{0.22}$ | $1.19 \times P_{ope}^{0.35}$ | $1.68 \times P_{ope}^{0.24}$ | |
| Ex. 1 | Kerosene A | 0.29(3) | 220 | 1.15 | 0.62 | 1.36 | 0.78 | 1.25 | 650 |
| Ex. 2 | | | 250 | 1.31 | | | | | 400 |
| Comp. Ex. 1 | $T_{50}$: 191.5° C. | 0.49(5) | 140 | 0.73 | 0.77 | 1.52 | 0.93 | 1.42 | 220 |
| Ex. 3 | | | 250 | 1.31 | | | | | 1,400 |
| Comp. Ex. 2 | | | 300 | 1.57 | | | | | 120 |
| Comp. Ex. 3 | Kerosene B | 0.10(1) | 250 | 1.23 | 0.38 | 1.07 | 0.53 | 0.96 | 80 |
| Ex. 4 | $T_{50}$: 203.5° C. | 0.29(3) | 250 | 1.23 | 0.62 | 1.36 | 0.78 | 1.25 | 580 |
| Ex. 5 | | 0.49(5) | 270 | 1.33 | 0.77 | 1.52 | 0.93 | 1.42 | 920 |
| Ex. 6 | | | 300 | 1.47 | | | | | 740 |
| Comp. Ex. 4 | Kerosene C | 0.10(1) | 250 | 1.20 | 0.38 | 1.07 | 0.53 | 0.96 | 90 |
| Ex. 7 | $T_{50}$: 208.5° C. | 0.29(3) | 230 | 1.10 | 0.62 | 1.36 | 0.78 | 1.25 | 450 |
| Ex. 8 | | | 260 | 1.25 | | | | | 600 |
| Comp. Ex. 5 | | | 150 | 0.72 | 0.77 | 1.52 | 0.93 | 1.42 | 160 |
| Ex. 9 | | | 220 | 1.06 | | | | | 510 |
| Ex. 10 | | | 270 | 1.29 | | | | | 1,100 |
| Comp. Ex. 6 | | | 330 | 1.58 | | | | | 40 |
| Ex. 11 | | 0.69(7) | 200 | 0.96 | 0.90 | 1.64 | 1.04 | 1.53 | 430 |
| Ex. 12 | | | 250 | 1.20 | | | | | 820 |

TABLE 2-continued

Desulfurization test results of liquid hydrocarbon samples

| | | | | Formula (1) | | Formula (2) | | 0.2 ppm Breakthrough life (liquid hydrocarbon/ desulfurizing agent) |
|---|---|---|---|---|---|---|---|---|
| Liquid hydrocarbon | Operation pressure [MPa]*1 (kg/cm²A) | Operation temp. (° C.) | $T_{ope}/T_{50}$ | $1.06 \times P_{ope}^{0.44}$ | $1.78 \times P_{ope}^{0.22}$ | $1.19 \times P_{ope}^{0.35}$ | $1.68 \times P_{ope}^{0.24}$ | |
| Ex. 13 | Gas oil A | 0.29(3) | 280 | 1.21 | 0.62 | 1.36 | 0.78 | 1.25 | 2,500 |
| Ex. 14 | | | 220 | 0.95 | | | | | 2,000 |
| Comp. Ex. 7 | $T_{50}$: 231.0° C. | | 340 | 1.47 | | | | | 790 |
| Ex. 15 | Gasoline A | 0.29(3) | 110 | 1.16 | 0.62 | 1.36 | 0.78 | 1.25 | 2,900 |
| Ex. 16 | | | 80 | 0.84 | | | | | 2,000 |
| Comp. Ex. 8 | $T_{50}$: 95.0° C. | | 50 | 0.53 | | | | | 890 |

*1Operation pressure is based on MPa (value converted to kg/cm²A)

As is clear from Table 2, in all desulfurization tests carried out in the Comparative Examples, where $T_{ope}/T_{50}$ values are in excess of the upper limit of formula (1) or less than the lower limit of formula (1), the 0.2 ppm breakthrough life falls within a low range from 40 to 220. In contrast, in the Examples, where $T_{ope}/T_{50}$ values fall within a range of the lower limit of formula (1) or (2) to the upper limit of formula (1) or (2), the 0.2 ppm breakthrough life falls within a high range from 400 to 1,400.

The results indicate that, when desulfurization conditions (operation temperature and operation pressure) are controlled such that $T_{ope}/T_{50}$ of formula (1) or (2) falls within a range of the corresponding lower limit to the corresponding upper limit, sulfur content of kerosene can be effectively removed to a sulfur concentration of 0.2 mass ppm or lower for a long period of time and the service life of the desulfurizing agent can be prolonged.

<Reforming Test of Desulfurized Kerosene>

Kerosene sample which had been desulfurized (to a sulfur concentration of 0.2 mass ppm or lower) in Example 5 shown in Table 2 was employed as a fuel oil. The fuel oil was steam reformed by means of a reforming apparatus filled with a ruthenium-based reforming catalyst (amount of supported ruthenium: 3% by mass) (20 mL). The employed reforming conditions were as follows: pressure of atmospheric pressure, steam/carbon (mole ratio) of 3, LHSV of 0.5 hr⁻¹, inlet temperature of 550° C., and outlet temperature of 750° C.

The percent conversion to hydrogen at the inlet of the reforming apparatus 500 hours after the start of reforming was found to be 100%.

INDUSTRIAL APPLICABILITY

According to the desulfurization method of the present invention, desulfurization conditions are controlled as appropriate from distillation characteristics of liquid hydrocarbon to be employed such as kerosene. Through employment of such appropriate desulfurization conditions, sulfur content of liquid hydrocarbon such as kerosene can be effectively removed to a sulfur concentration of 0.2 mass ppm or lower for a long period of time, and the service life of the desulfurizing agent can be prolonged.

According to the method of the present invention for producing hydrogen for use in a fuel cell, hydrogen for use in a fuel cell can be effectively produced by reforming the liquid hydrocarbon such as kerosene which has been desulfurized through the desulfurization method of the present invention, and the service life of the reforming catalyst can be prolonged.

The invention claimed is:

1. A method for producing a desulfurized liquid hydrocarbon, comprising:
   identifying distillation characteristics of a liquid hydrocarbon;
   selecting desulfurization conditions based on the distillation characteristics of the liquid hydrocarbon; and
   contacting the liquid hydrocarbon with a metallic desulfurizing agent under the desulfurization conditions to obtain the desulfurized liquid hydrocarbon;
   wherein:
   selecting the desulfurization conditions comprises selecting conditions satisfying the following formula (1):

$$1.06 \times P_{ope}^{0.44} < T_{ope}/T_{50} < 1.78 \times P_{ope}^{0.22} \quad (1)$$

wherein
   $T_{ope}$ represents operation temperature in ° C.;
   $P_{ope}$ represents operation pressure in MPa; and
   $T_{50}$ represents a temperature per 50 percent recovered as determined by the "test method for distillation at atmospheric pressure" provided in the standard JIS K2254 "Petroleum products—Determination of distillation characteristics" as revised in 1998.

2. The method according to claim 1, wherein the desulfurization conditions satisfy the following formula (2):

$$1.19 \times P_{ope}^{0.35} < T_{ope}/T_{50} < 1.68 \times P_{ope}^{0.24} \quad (2).$$

3. The method according to claim 1, wherein the metallic desulfurizing agent is a nickel-copper-based desulfurizing agent.

4. The method according to claim 1, wherein the liquid hydrocarbon comprises at least one member selected from the group consisting of a gasoline fraction, a kerosene fraction, and a gas oil fraction.

5. The method according to claim 1, wherein
   the metallic desulfurizing agent includes a porous inorganic oxide and a metallic element including at least nickel (Ni) supported thereon.

* * * * *